US011257502B2

(12) United States Patent
Himmelstein

(10) Patent No.: US 11,257,502 B2
(45) Date of Patent: Feb. 22, 2022

(54) PROVIDING ACCESS WITH A PORTABLE DEVICE AND VOICE COMMANDS

(71) Applicant: Tamiras Per Pte. Ltd., LLC, Wilmington, DE (US)

(72) Inventor: Richard B. Himmelstein, Breckenridge, CO (US)

(73) Assignee: Tamiras Per Pte. Ltd., LLC, Wilmington, DE (US)

( * ) Notice: Subject to any disclaimer, the term of this patent is extended or adjusted under 35 U.S.C. 154(b) by 0 days.

(21) Appl. No.: 17/243,259

(22) Filed: Apr. 28, 2021

(65) Prior Publication Data

US 2021/0249020 A1 Aug. 12, 2021

Related U.S. Application Data

(63) Continuation of application No. 16/291,639, filed on Mar. 4, 2019, which is a continuation of application
(Continued)

(51) Int. Cl.
*G10L 15/22* (2006.01)
*G10L 17/08* (2013.01)
(Continued)

(52) U.S. Cl.
CPC ............ *G10L 17/08* (2013.01); *B60R 25/241* (2013.01); *B60R 25/257* (2013.01); *G10L 15/26* (2013.01);
(Continued)

(58) Field of Classification Search
CPC ......... G10L 15/00; G10L 15/08; G10L 15/22; G10L 15/24; G10L 15/26; G10L 2015/221–228
(Continued)

(56) References Cited

U.S. PATENT DOCUMENTS 3,772,668 A 11/1973 Smith
4,506,378 A 3/1985 Noso et al.
(Continued)

FOREIGN PATENT DOCUMENTS

WO 1998/010412 3/1998

OTHER PUBLICATIONS

US 6,731,928 B1, 05/2004, Tanaka et al. (withdrawn)
(Continued)

*Primary Examiner* — Qi Han
(74) *Attorney, Agent, or Firm* — Volpe Koenig

(57) ABSTRACT

A system for operating an automobile comprising a transponder having a user interface to receive commands from a user and operating as a virtual assistant, wherein the commands comprise commands for operation of a door of the automobile and a microprocessor in the automobile responsive to the transponder. The system for operating an automobile further comprising a detector subsystem configured to determine a potential strike of an object based on a determined distance to the object, wherein the microprocessor receives a communication from the transponder and wherein the automobile is configured to send a command to a door of the automobile in response to the communication. Further, the system in the automobile is configured to avoid the potential strike determined by the detector system by limiting the operation of the door and producing an alert to a user as to the potential strike.

4 Claims, 4 Drawing Sheets

Related U.S. Application Data

No. 15/223,977, filed on Jul. 29, 2016, now Pat. No. 10,224,039, which is a continuation of application No. 14/173,426, filed on Feb. 5, 2014, now Pat. No. 9,406,300, which is a continuation of application No. 11/205,891, filed on Aug. 17, 2005, now Pat. No. 8,648,692.

(51) Int. Cl.

| | |
|---|---|
| ***B60R 25/25*** | (2013.01) |
| ***B60R 25/24*** | (2013.01) |
| ***G10L 15/26*** | (2006.01) |
| ***G10L 17/22*** | (2013.01) |
| *G10L 17/24* | (2013.01) |

(52) U.S. Cl.

CPC .............. *G10L 17/22* (2013.01); *G10L 17/24* (2013.01); *G10L 2015/223* (2013.01)

(58) Field of Classification Search

USPC ..... 704/275, 270.1, 273, 231, 250, 251, 270
See application file for complete search history.

(56) References Cited

U.S. PATENT DOCUMENTS 4,591,823 A 5/1986 Horvat
4,593,403 A 6/1986 Kishi et al.
4,677,569 A 6/1987 Nakano et al.
4,827,520 A 5/1989 Zeinstra
4,856,072 A 8/1989 Schneider et al.
5,040,212 A 8/1991 Bethards
5,086,394 A 2/1992 Shapira
5,117,460 A 5/1992 Berry et al.
5,153,583 A 10/1992 Murdoch
5,153,918 A 10/1992 Tuai
5,170,499 A 12/1992 Grothause
5,199,080 A 3/1993 Kimura et al.
5,226,256 A 7/1993 Fries et al.
5,335,276 A 8/1994 Thompson et al.
5,365,574 A 11/1994 Hunt et al.
5,375,063 A 12/1994 Peck et al.
5,389,824 A 2/1995 Moroto
5,420,794 A 5/1995 James
5,422,816 A 6/1995 Sprague et al.
5,425,058 A 6/1995 Mui
5,450,525 A 9/1995 Russell et al.
5,451,964 A 9/1995 Babu
5,459,304 A 10/1995 Eisenmann
5,465,290 A 11/1995 Hampton et al.
5,465,401 A 11/1995 Thompson
5,473,602 A 12/1995 McKenna et al.
5,479,490 A 12/1995 Nakashima et al.
5,495,609 A 2/1996 Scott
5,509,852 A 4/1996 Clark
5,539,398 A 7/1996 Hall et al.
5,572,201 A 11/1996 Graham et al.
5,650,774 A 7/1997 Drori
5,663,734 A 9/1997 Krasner
5,668,880 A 9/1997 Alajajian
5,668,929 A 9/1997 Foster, Jr.
5,673,034 A 9/1997 Saliga
5,675,633 A 10/1997 Kopp et al.
5,704,008 A 12/1997 Duvall, Jr.
5,705,991 A 1/1998 Kniffin
5,706,399 A 1/1998 Bareis
5,731,785 A 3/1998 Lemelson et al.
5,731,788 A 3/1998 Reeds
5,732,074 A 3/1998 Spaur et al.
5,740,532 A 4/1998 Fernandez et al.
5,767,795 A 6/1998 Schaphorst
5,774,858 A 6/1998 Taubkin
5,777,571 A 7/1998 Chuang
5,801,616 A 9/1998 Ghazarian et al.
5,805,082 A 9/1998 Hassett
5,812,067 A 9/1998 Bergholz et al.
5,847,661 A 12/1998 Ricci
5,864,603 A 1/1999 Haavisto et al.
5,875,183 A 2/1999 Nitadori
5,884,312 A 3/1999 Dustan et al.
5,900,825 A 5/1999 Pressel et al.
5,907,793 A 5/1999 Reams
5,908,454 A 6/1999 Zyburt et al.
5,917,408 A 6/1999 Cardillo et al.
5,929,769 A 7/1999 Garnault
5,952,941 A 9/1999 Mardirossian
5,959,540 A 9/1999 Walter
5,960,085 A 9/1999 De la Huerga
5,970,457 A 10/1999 Brant et al.
5,974,368 A 10/1999 Schepps et al.
5,982,281 A 11/1999 Layson
5,983,161 A 11/1999 Lemelson et al.
6,009,323 A 12/1999 Heffield et al.
6,014,090 A 1/2000 Rosen et al.
6,018,659 A 1/2000 Ayyagari et al.
6,018,699 A 1/2000 Baron et al.
6,028,537 A 2/2000 Suman et al.
6,032,054 A 2/2000 Schwinke
6,041,410 A 3/2000 Hsu et al.
6,052,598 A 4/2000 Rudrapatna et al.
6,060,995 A 5/2000 Wicks et al.
6,073,840 A 6/2000 Marion
6,084,512 A 7/2000 Elberty et al.
6,084,870 A 7/2000 Wooten et al.
6,097,313 A 8/2000 Takahashi et al.
6,097,974 A 8/2000 Camp et al.
6,119,088 A 9/2000 Ciluffo
6,119,095 A 9/2000 Morita
6,122,514 A 9/2000 Spaur et al.
6,140,939 A 10/2000 Flick
6,150,937 A 11/2000 Rackman
6,157,317 A 12/2000 Walker et al.
6,161,005 A 12/2000 Pinzon
6,175,922 B1 1/2001 Wang
6,177,873 B1 1/2001 Cragun
6,181,026 B1 1/2001 Treharne et al.
6,189,105 B1 2/2001 Lopes
6,195,542 B1 2/2001 Griffith
6,198,996 B1 3/2001 Berstis
6,199,045 B1 3/2001 Giniger et al.
6,208,844 B1 3/2001 Abdegany
6,208,862 B1 3/2001 Lee
6,218,958 B1 4/2001 Eichstaedt et al.
6,225,890 B1 5/2001 Murphy
6,252,539 B1 6/2001 Phillips et al.
6,252,544 B1 6/2001 Hoffberg
6,253,184 B1 6/2001 Ruppert
6,255,953 B1 7/2001 Barber
6,275,231 B1 8/2001 Obradovich et al.
6,275,774 B1 8/2001 Baron, Sr. et al.
6,282,464 B1 8/2001 Obradovich
6,288,634 B1 9/2001 Weiss et al.
6,295,001 B1 9/2001 Barber
6,295,346 B1 9/2001 Markowitz et al.
6,295,492 B1 9/2001 Lang et al.
6,304,816 B1 10/2001 Berstis
6,311,060 B1 10/2001 Evans et al.
6,323,803 B1 11/2001 Jolley et al.
6,330,499 B1 12/2001 Chou et al.
6,356,868 B1 3/2002 Yuschik et al.
6,366,893 B2 4/2002 Hannula et al.
6,377,825 B1 4/2002 Kennedy et al.
6,389,397 B1 5/2002 Otto
6,401,068 B1 6/2002 Cherveny et al.
6,405,033 B1 6/2002 Kennedy, III et al.
6,408,272 B1 6/2002 White et al.
6,424,912 B1 7/2002 Correia et al.
6,437,689 B2 8/2002 Kawai et al.
6,463,415 B2 10/2002 St. John
6,463,462 B1 10/2002 Smith et al.
6,466,796 B1 10/2002 Jacobson et al.
6,480,699 B1 11/2002 Lovoi
6,490,525 B2 12/2002 Baron, Sr. et al.
6,493,550 B1 12/2002 Raith

(56) References Cited

U.S. PATENT DOCUMENTS 6,493,633 B2 12/2002 Baron, Sr. et al.
6,493,669 B1 12/2002 Curry et al.
6,498,987 B1 12/2002 Kelly et al.
6,498,989 B1 12/2002 Pisetski et al.
6,505,123 B1 1/2003 Root et al.
6,510,415 B1 1/2003 Talmor et al.
6,522,772 B1 2/2003 Morrison et al.
6,522,875 B1 2/2003 Dowling et al.
6,522,977 B2 2/2003 Corrigan et al.
6,526,268 B1 2/2003 Marrah et al.
6,535,743 B1 3/2003 Kennedy, III et al.
6,539,232 B2 3/2003 Hendrey et al.
6,542,748 B2 4/2003 Hendrey et al.
6,542,749 B2 4/2003 Tanaka et al.
6,542,750 B2 4/2003 Hendrey et al.
6,549,130 B1 4/2003 Joao
6,574,592 B1 6/2003 Nankawa et al.
6,577,227 B1 6/2003 Kirchlinde et al.
6,581,036 B1 6/2003 Varney et al.
6,584,439 B1 6/2003 Geilhufe et al.
6,590,529 B2 7/2003 Schwoegler
6,594,630 B1 7/2003 Zlokarnik et al.
6,603,405 B2 8/2003 Smith
6,611,201 B1 8/2003 Bishop et al.
6,618,593 B1 9/2003 Drutman et al.
6,624,739 B1 9/2003 Stobbe
6,628,928 B1 9/2003 Crosby et al.
6,646,559 B2 11/2003 Smith
6,647,270 B1 11/2003 Himmelstein
6,650,224 B1 11/2003 Weigl et al.
6,654,689 B1 11/2003 Kelly et al.
6,678,516 B2 1/2004 Nordman et al.
6,690,681 B1 2/2004 Preston et al.
6,691,089 B1 2/2004 Su et al.
6,700,482 B2 3/2004 Ververs et al.
6,711,474 B1 3/2004 Treyz et al.
6,726,636 B2 4/2004 Der Ghazarian et al.
6,728,323 B1 4/2004 Chen et al.
6,728,528 B1 4/2004 Loke
6,745,021 B1 6/2004 Stevens
6,748,318 B1 6/2004 Jones
6,751,452 B1 6/2004 Kupczyk et al.
6,754,485 B1 6/2004 Obradovich et al.
6,754,585 B2 6/2004 Root et al.
6,772,331 B1 8/2004 Hind
6,812,860 B1 11/2004 Schwarzwalder
6,816,878 B1 11/2004 Zimmers et al.
6,819,919 B1 11/2004 Tanaka
6,842,774 B1 1/2005 Piccioni
6,853,849 B1 2/2005 Taognazzini
6,915,126 B2 7/2005 Mazzaro
7,042,337 B2 5/2006 Borders et al.
7,054,819 B1 5/2006 Loveland
7,062,379 B2 6/2006 Videtich
7,092,723 B2 8/2006 Himmelstein
7,123,926 B2 10/2006 Himmelstein
7,155,335 B2 12/2006 Rennels
7,174,253 B2 2/2007 Videtich
7,216,145 B2 5/2007 Collings, III
7,257,426 B1 8/2007 Witkowski et al.
7,330,693 B1 2/2008 Goss
7,450,955 B2 11/2008 Himmelstein
7,463,896 B2 12/2008 Himmelstein
7,505,772 B2 3/2009 Himmelstein
7,536,189 B2 5/2009 Himmelstein
2001/0044309 A1 11/2001 Bar et al.
2001/0052847 A1 12/2001 Auerbach
2002/0016171 A1 2/2002 Doganata et al.
2002/0032591 A1* 3/2002 Mahaffy ............. H04M 3/5108 709/202
2002/0118579 A1 8/2002 Lucy et al.
2002/0147766 A1 10/2002 Vanska et al.
2002/0174073 A1 11/2002 Nordman
2003/0122652 A1 7/2003 Himmelstein
2003/0169181 A1 9/2003 Taylor
2003/0169185 A1 9/2003 Taylor
2004/0002348 A1 1/2004 Fracaroli
2004/0010591 A1 1/2004 Sinn et al.
2004/0014457 A1 1/2004 Stevens
2004/0067752 A1 4/2004 Himmelstein
2004/0145459 A1 7/2004 Himmelstein
2004/0162064 A1 8/2004 Himmelstein
2004/0203931 A1 10/2004 Karaoguz
2004/0220798 A1 11/2004 Chi et al.
2004/0248569 A1 12/2004 Kondou et al.
2005/0021666 A1 1/2005 Dinnage et al.
2005/0085972 A1* 4/2005 Martinez ................. E05C 17/00 701/49
2005/0233741 A1 10/2005 Zamani
2007/0054677 A1 3/2007 Himmelstein
2007/0082678 A1 4/2007 Himmelstein
2008/0119212 A1 5/2008 Himmelstein
2008/0146248 A1 6/2008 Himmelstein
2009/0156125 A1 6/2009 Himmelstein
2009/0156203 A1 6/2009 Himmelstein

OTHER PUBLICATIONS

"Match.com Launches Matrch Mobile with AT&T Wireless," Match.com Corporate, Dec. 2003.
"Match.com's Wireless Dating Service MatchMobile Launches Photo Profiles," Match.com Corporate, Dec. 2003.
"Our Biggest Store: Organization Find People Nearby," AT&T Wireless, http://www.attwireless.com/personal/features/organization/findfriends.jhtml, Feb. 2004.
AT&T Wireless, Features and Services User Guide, How to Use Your AT&T Wireless Features and Services, Feb. 6, 2004.
Auerbach, Emergency Management Communciations System, U.S. Appl. No. 60/111,281, filed Dec. 7, 1998.
Auerbach, Emergency Management Communciations System, U.S. Appl. No. 60/120,096, filed Feb. 16, 1999.
Final Rejection, U.S. Appl. No. 11/205,891, dated Apr. 11, 2013.
Final Rejection, U.S. Appl. No. 11/205,891, dated Jun. 18, 2010.
Final Rejection, U.S. Appl. No. 11/205,891, dated May 6, 2009.
Final Rejection, U.S. Appl. No. 11/205,891, dated Nov. 1, 2011.
Final Rejection, U.S. Appl. No. 15/223,977, filed Jun. 8, 2018.
Final Rejection, U.S. Appl. No. 16/291,639, dated Jan. 28, 2021.
Final Rejection, U.S. Appl. No. 16/291,639, dated Jun. 29, 2020.
IEEE Std. 802.11b-1999 (R2003); Supplement to ANSI/IEEE Std. 802.11, 1999 Edition, (96 pgs.).
IEEE Std. 802.11p, May 25, 2006 (4 pgs.).
Non-Final Rejection, U.S. Appl. No. 10/315,886, now U.S. Pat. No. 6,952,155, dated Dec. 17, 2004.
Non-Final Rejection, U.S. Appl. No. 11/205,891, dated Aug. 3, 2012.
Non-Final Rejection, U.S. Appl. No. 11/205,891, dated Apr. 21, 2011.
Non-Final Rejection, U.S. Appl. No. 11/205,891, dated Oct. 30, 2009.
Non-Final Rejection, U.S. Appl. No. 11/205,891, dated Nov. 20, 2008.
Non-Final Rejection, U.S. Appl. No. 14/173,426, dated Sep. 21, 2015.
Non-Final Rejection, U.S. Appl. No. 15/223,977, dated Nov. 22, 2017.
Non-Final Rejection, U.S. Appl. No. 16/291,639, dated Jan. 16, 2020.
Non-Final Rejection, U.S. Appl. No. 16/291,639, dated Oct. 6, 2020.
Notice of Allowance, U.S. Appl. No. 10/315,886, now U.S. Pat. No. 6,952,155, dated May 17, 2005.
Notice of Allowance, U.S. Appl. No. 11/205,891, dated Oct. 2, 2013.
Notice of Allowance, U.S. Appl. No. 14/173,426, dated Mar. 28, 2016.
Notice of Allowance, U.S. Appl. No. 15/223,977, filed Oct. 17, 2018.
PCT International Search Report for PCT/US02/40114, dated Apr. 12, 2005 (24 pgs.).

(56) References Cited

OTHER PUBLICATIONS

Press Release, GM's OnStar Subsidiary Brings Location-Based, Real-Time Traffic and Road Condition Information Into the Vehicle, Nov. 13, 2000.
Selingo, Protecting the Cellphone User's Right to Hide, The New York Times, Feb. 5, 2004.
Specification of the Bluetooth System; Specification vol. 1; Wireless connections made easy; Core; V1.0B, Dec. 1, 1999 (1082 pgs.).
Wireless Services from AccuWeather.com, http://www.accuweather.com/iwxpage/adc/mobile/messenger.htm, Sep. 9, 2004.
Yahoo Finance, Private Inventor Files Patent Application for Telematics-Based Public and Emergency First Responders Safety Advisory System, Feb. 2004.

* cited by examiner

PROVIDING ACCESS WITH A PORTABLE DEVICE AND VOICE COMMANDS

CROSS REFERENCE TO RELATED APPLICATION

This application is a continuation of U.S. patent application Ser. No. 16/291,639, filed Mar. 4, 2019, which is a continuation of U.S. patent application Ser. No. 15/223,977, filed Jul. 29, 2016, which issued as U.S. Pat. No. 10,224,039 on Mar. 5, 2019, which is a continuation of U.S. patent application Ser. No. 14/173,426, filed Feb. 5, 2014, which issued as U.S. Pat. No. 9,406,300 on Aug. 2, 2016, which is a continuation of U.S. patent application Ser. No. 11/205,891, filed Aug. 17, 2005, which issued as U.S. Pat. No. 8,648,692 on Feb. 11, 2014, which are all incorporated by reference as if fully set forth.

BACKGROUND

The present invention relates to security systems. In particular, the invention relates to a smart security device or system which incorporates, amongst other features, voice-control and proximity detection to provide enhanced security.

Voice recognition has been, and continues to be, developed to provide control of electronic systems using spoken commands. Spoken commands may not only facilitate easier use of a system, but also enhance the security aspects of a system. For instance, the voice pattern of the user may be part of the security system which authenticates a user's authorization for access. U.S. Pat. No. 4,856,072 discloses a vehicle security system which can be voice actuated by any authorized person. In this manner, voice activated control systems are known which control various functions within an automobile.

Electronic identification devices which incorporate radio transponders are also known in the art. Transponders are generally categorized as either active or passive, based upon the power source used to power the transponder. Active transponders periodically transmit encoded data on a selected frequency to a remote receiver located on the item to which access is desired. For example, U.S. Pat. No. 3,772,668 discloses a freight security system comprising a base station and active transponders, each of which include a self-contained power supply.

In contrast, for passive transponders, the RF carrier signal received from an interrogating unit is the source of operating power. Accordingly, passive transponders are not activated until they come within the vicinity of the interrogating unit. U.S. Pat. No. 5,153,583 discloses a portable passive transponder having a single inductive coil for simultaneous reception and transmission of signals to and from an interrogating unit.

The security system according to the present invention increases security while eliminating the need for a key and/or a multiplicity of control buttons.

SUMMARY

The present invention is a security device or system which permits enhanced security and control using a voice signal in combination with a transponder unit. A user who desires the ability to control an object, such as an automobile, or to access and control an area, such as a building, carries a small portable radio transponder unit. The transponder unit is preferably incorporated into a plastic card, such as a credit card, but can also be incorporated in a wristband, watch, wallet or piece of jewelry. When the transponder comes within a predetermined range of a base unit located on the object to be controlled, the transponder transmits an RF signal including an identification code and interfaces with a base unit. The base unit receives the RF signal and verifies if that particular identification code is valid. If the identification code is valid, the base unit instructs the security device or system to await a vocal command.

Upon receiving a voice command, the security device or system authenticates the voice command by matching it with a voiceprint template that is previously stored. If there is a match, the device or system performs the function that was requested. For example, an authorized user may direct an automobile security system to perform various functions such as "unlock and open driver door" or "unlock and open all doors." If both the transponder signal and voice command are approved, the system will perform the function accordingly. The present invention increases security by ensuring that the transponder and voice command are authentic and are within a predefined distance from each other and the base unit. The present invention further provides a variety of optional, smart features including virtual digital assistance, interactive personalities, and various smart function control features.

DETAILED DESCRIPTION OF THE INVENTION

Figure 1:
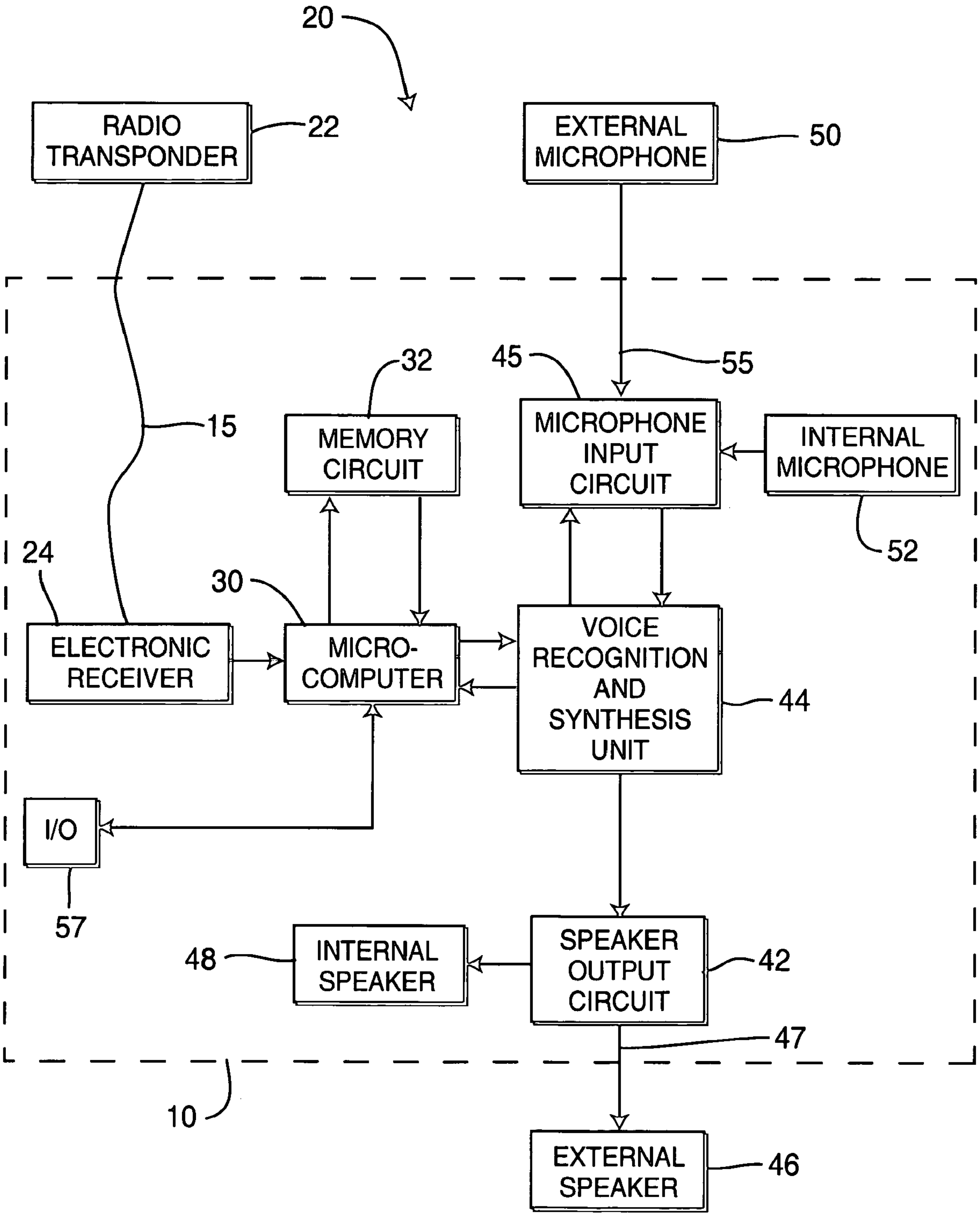
FIG. 1 is a block diagram of a security system according to the present invention.

The present invention will be described with reference to the drawing Figures where like numerals represent like elements throughout.

To facilitate understanding of the present invention, the invention will be described with reference to an automobile security system 20. However, those of skill in the art realize that the teachings of the present invention are equally applicable to a security system for a building such as a residence, commercial establishment or professional office building. The present invention is also adaptable to be installed as a security device on an individual door, window, any type of machinery; any type of computer or electronic equipment; any type of recreational equipment, or even individual pad or combination locks.

A block diagram of an automobile security system 20 embodying the present invention is shown in FIG. 1. A dashed line 10 graphically represents a vehicle, in which all of the components located within the area defined by the dashed line 10 are typically internal to the vehicle. The system 20 includes a portable radio transponder 22, an electronic receiver 24, a microcomputer 30 including an accessible memory circuit 32, a voice-recognition and synthesis unit 44, a microphone input circuit 45, external and internal microphones 50, 52, a speaker output circuit 42 and external and internal speakers 46, 48. The transponder 22 continually transmits an identification signal 15 which is unique to that user or that particular transponder 22.

As aforementioned, there are two types of transponders: 1) active transponders; and 2) passive transponders. Active transponders include a power source such as a battery and a transmitter, and periodically transmit an identification signal. A passive transponder is inactive until it comes within a predetermined range of an activation unit. The passive transponder is activated when it receives an RF signal from an activating unit; whereupon the transponder is energized and begins to transmit an identification signal. Although the present invention is being described with reference to an active transponder, it is equally applicable to the use of a passive transponder.

When a user carrying the active transponder 22, (which continually transmits an RF signal including an identification code 15), comes within a predetermined range of the receiver 24 which is mounted on the vehicle 10, the receiver 24 receives the RF signal 15. The receiver 24 then feeds the identification code to the microcomputer 30 which processes the identification code to determine whether the identification code matches the identification data previously stored in the memory circuit 32.

Once a positive identification has been made, the microcomputer 30 generates a control signal to activate the voice recognition and synthesis unit 44. The voice recognition and synthesis unit 44, which is connected to a microphone input circuit 45 and a speaker output circuit 42, sends a signal to the microphone input circuit 45 to begin detecting all audible signals within the range of the microphone 50.

Voice commands are recognized by either an external or internal microphone 50, 52 and are input signals 55 to the microphone input circuit 45. The microphone input circuit 45 converts the input signals 55 to digital format. The voice recognition and synthesis unit 44 then receives the digital input signal from the microphone input circuit 45 and sends it to the microcomputer 30, which analyzes the digital input signal.

The microcomputer 30 has an associated memory (not shown) which includes a plurality of "templates" for each potential spoken command as spoken by the user. Each spoken command will have at least one action for the system to initiate. For example, the template for the command "unlock driver's door" includes an entry in memory which comprises a recording of the user's voice speaking the command "unlock driver's door", which was digitized, processed and stored in memory. As those skilled in the art should realize, there are many different signal processing techniques which may be utilized to process and store a voice signal. These voice recognition and processing techniques are being increasingly used for word processing (such as Dragon Naturally Speaking and Via Voice typing software), VCR programming and in many other types of consumer applications. It is intended that the present invention be utilized in conjunction with any current or future type of voice recognition. Accordingly, a voiceprint template in digital format for the words "unlock driver's door" as spoken by the user is stored in memory.

The system 20 permits errors in the commands within a predetermined tolerance. The system 20 is configurable to tailor the spoken commands particularly to a single user's voice, may be programmed for several or many users, or may include a large error tolerance such that it is generalized to any person's spoken commands. If a particular command is not tailored to a specific user's voice, the received voice command voiceprint template stored in memory will permit a greater degree of error than with the templates which are customized to a particular user's voice.

TABLE 1

| | COLUMN | | | | | | |
|---|---|---|---|---|---|---|---|
| | 1 VOICE COMMAND | 2 SECURITY LEVEL | 3 USER | 4 VOICEPRINT TEMPLATE | 5 ENABLED | 6 ACTION | 7 HIERARCHY |
| ROW 1 | Unlock Driver's Door | 1 | Richard | 01101111 . . . | Yes | Unlock Door | 1 |
| | | | Victoria | 01110110 . . . | Yes | Unlock Door | 2 |
| 2 | Turn On Stereo | 2 | Richard | 10101110 . . . | Yes | Turn On 1060 AM Volume Setting 2 | 1 |
| | | | Victoria | 11011011 . . . | Yes | Turn On 100.3 FM Max Volume | 2 |
| 3 | Turn Off Stereo | 10 | Richard | 11101110 . . . | Yes | Turn Off | 1 |
| | | | Victoria | 01101110 . . . | Yes | Turn Off | 2 |
| 4 | Turn On Wipers Low | 10 | Richard | 11111000 . . . | Yes | Turn On Setting 3 | 1 |
| | | | Victoria | 10101010 . . . | No | XXXX | X |
| 5 | Turn On Wipers High | 10 | Richard | 10111110 . . . | Yes | Turn On Setting 9 | 1 |
| | | | Victoria | 10100001 . . . | No | XXXX | X |
| 6 | Sunny Day | 5 | Richard | 10111011 . . . | Yes | 1) Open All Windows 2) Open Sunroof 3) Turn On Stereo To 100.3 FM Max Volume 4) Turn On Fan High | 1 |

Table 1 shows the voiceprint templates as stored in memory. As shown, each voice command is associated with at least six additional fields of information as shown by column 2-7 in Table 1: security level, user, voiceprint template, enabled, action, hierarchy. For example, if the voice command is "unlock driver's door", as shown in column 1, row 1 there are two associated voiceprint templates as shown in column 4, row 1. The first template is associated with the user Richard, and the second template is associated with the user Victoria. In this example, Richard and Victoria can each create their own voiceprint template by speaking the command "unlock driver's door" into the internal or external microphones 50, 52. This information is processed as described hereinbefore and stored in memory as a voiceprint template.

The user may also customize the particular action associated with the voice command. As shown in column 6, row 1, the only action associated with "unlock driver's door" is to unlock the door. In a second example, however, for the voice command "turn on stereo" the user Richard has customized the action associated with turning on the stereo to the following: turn on 1060 am, volume setting 2. In contrast, the user Victoria has customized the action associated with her voiceprint template for turn on stereo to: turn on 100.3 FM, max volume. In this manner, each voice command is customized in accordance with the user's specific requirements.

There may be situations where different users' commands may conflict. In the aforementioned example regarding turning on the stereo, the actions associated with the voice command "turn on stereo" as shown in column 6 conflict regarding both the station selection and the volume setting. In this case, the hierarchy field shown in column 7 gives priority to the user Richard. The user Victoria has second priority. If additional users were specified, they can in turn have their own priority under the hierarchy.

The security level column, shown as column 2, permits the system 20 to accept varying thresholds for voiceprint template identification. This enables certain voice commands to have a higher level of security than other commands. For example, the voice command "unlock driver's door" has a security level of 1, indicating that it is a highly secure function. For a higher security level, the threshold for voiceprint template identification will be extremely high; i.e., the voiceprint template must be highly correlated with the received voice command. However, other voice commands may have lower security levels. For some commands such as "turn on wipers low" or "turn on wipers high", a security level of 10 permits an almost "generic" user to perform the command. This is a particularly useful feature, such as when valet personnel require access to certain functions and have not previously entered a voiceprint template into the system 20. It should be noted that, as shown in row 5 for the voice command "turn on wipers high", although a "generic" user may operate the wipers, the system 20 may detect the voiceprint template for Victoria and refuse to grant access to that command since the enabling feature shown in column 5 is "no". This will "lock out" the user Victoria and keep the user Victoria from performing that particular command. A user with a higher hierarchy can modify, override or disable any commands executed by a user with a lower hierarchy.

In the same manner, the system 20 may be utilized to create certain "mood" voice commands. For example, as shown in row 6, the user Richard may create a "sunny day" voice command with a plurality of associated actions to be undertaken by the system 20, such as:

1) open all windows;
2) open sun roof;
3) turn on stereo to 100.3 FM, max volume; and
4) turn on fan high.

In this matter, the system 20 may be customizable for any type of mood, weather or driving condition, and may also be tailored to plurality of individual users in a predetermined hierarchical basis.

Figure 3:
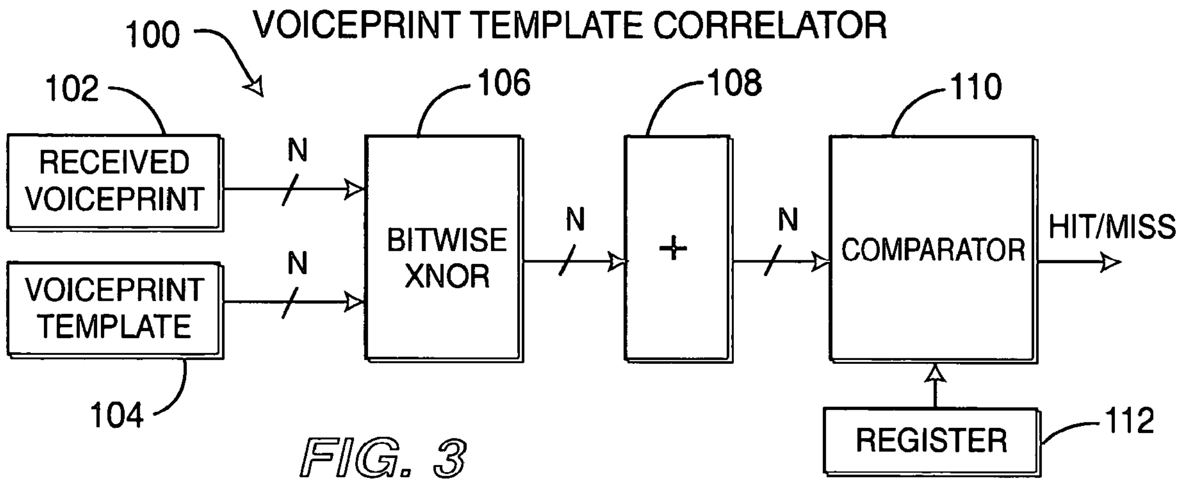
FIG. 3 is a block diagram of the correlator.

Referring to FIG. 3, the voiceprint template correlator 100 is shown. The correlator 100 is executed via the microcomputer 30 and the associated memory 32, (shown in FIG. 1), and includes a bitwise XNOR 106, an adder 108 a comparator 110 and a register 112. The voiceprint template 104 is compared to the received voiceprint 102 in a bitwise XNOR 106. The bitwise XNOR 106 compares a received voiceprint 102 to the voiceprint template 104 on a bit-by-bit basis. Each bit match is output as a logical one, and each bit mismatch is output as a logical zero. The adder 108 adds up all of the matching bits and the comparator 110 compares the total number of matching bits to a threshold stored in the register 112. If the total number of matching bits exceeds the threshold as output by the register 112, a "hit" is registered and the received voiceprint 102 is considered to be the same as the voiceprint template 104. If the total number of matching bits is less than the threshold, a "miss" is output and the received voiceprint 102 is considered not to be the same as the voiceprint template 104. As aforementioned, the threshold set in register 112 is variable depending upon the security level shown column 2 of Table 1. Although a specific correlator 100 is shown in FIG. 3, it should be recognized that there are many types of correlators and comparators that perform the same type of function which are known to those skilled in the art. The correlator 100 as shown in FIG. 3 is intended to be illustrative and not exclusive.

All received voice commands are analyzed to determine whether they correspond to one of the voiceprint templates stored in memory. If there is no match, the system 20 will prompt the user to re-input the voice command by re-speaking the command. Once a predetermined number of attempts has been permitted, the system 20 will enter a "safe mode" and will refuse to accept any more voice commands for a predetermined period of time, which may be set by an authorized user upon initial system setup.

If the voice command corresponds to a selected one of the voiceprint templates stored in the memory circuit 32, the microcomputer 30 generates a control signal to the voice recognition and synthesis unit 44. The voice recognition and synthesis unit 44 provides a digital output signal to the speaker output circuit 42, which converts the digital output signal to an audible output signal and supplies the output instruction signal 47 to the external or internal speakers 46, 48. These speakers 46, 48 generate alarm signals as well as audible announcements to inform the user of the present operating status of the automobile security system 20. Additionally, the microcomputer 30 implements the actions associated with the particular voiceprint template via an input/out (I/O) interface 57. The I/O 57 interfaces with many of the vehicle's electrical and electro-mechanical systems to implement the associated actions. In such a manner, the system 20 may confirm that the instruction contained within the voice command is being carried out, or whether additional security information or clarification is necessary.

Voice commands can be used in this manner to control the functions of the vehicle. The functions include turning the ignition switch on/off, locking/unlocking doors, opening/closing (i.e. power) doors and windows, controlling turn signals, hazard lights, head lights, parking lights, interior lights, horn, radio (on, off, scan, set and other specific settings), defroster, temperature controls, wipers (including variable speeds), mirrors and all other basic functions of a vehicle. The system also permits voice activation or deactivation of the alarm system.

The transponder 22 and receiver 24 are also capable of using various platforms including, but not limited to, Bluetooth technology. A security system equipped with a Bluetooth radio establishes instant connection to another Bluetooth radio as soon as it comes into range. Since the Bluetooth technology supports both point-to-point and point-to-multipoint connections, several piconets can be established and linked together ad hoc. Bluetooth topology is best described as a multiple piconet structure. Using a technology such as Bluetooth allows transponders 22 and receivers 24 to communicate through other transponders 22 and receivers 24 (i.e. repeaters).

Optionally, the system 20 may allow the processing of the transponder signal 15 and voice command simultaneously. When both the transponder signal 15 and voice command are approved, the system 20 will perform the function being requested.

It is to be emphasized that the vehicle security application depicted in FIG. 1 is only exemplary of one of the many and varied applications with which the present invention may be used. For instance, the present invention can permit a user in a work environment to have access through locked doors, cabinets or computers, etc. Another use of this system 20 can be for hotels, whereby a guest can be given a plastic card having a transponder 22. The voice of the guest can be programmed at the front desk, upon registration such that the guest can open the door to selective hotel rooms. Further, various functions inside the hotel room may also be voice-controlled. This security system of the present invention can also secure electronic and other equipment, if a user's voice and identification data contained in the transponder unit have been pre-programmed. For instance, in order to use phones, computers other electronic devices, or have access to various web sites, the transponder 22 can include a memory and these devices can be programmed into the transponder 22 along with the user's voice. This permits one to use the particular electronic device or surf the web using their voice, and the transponder 22 can control the access.

Figure 2:
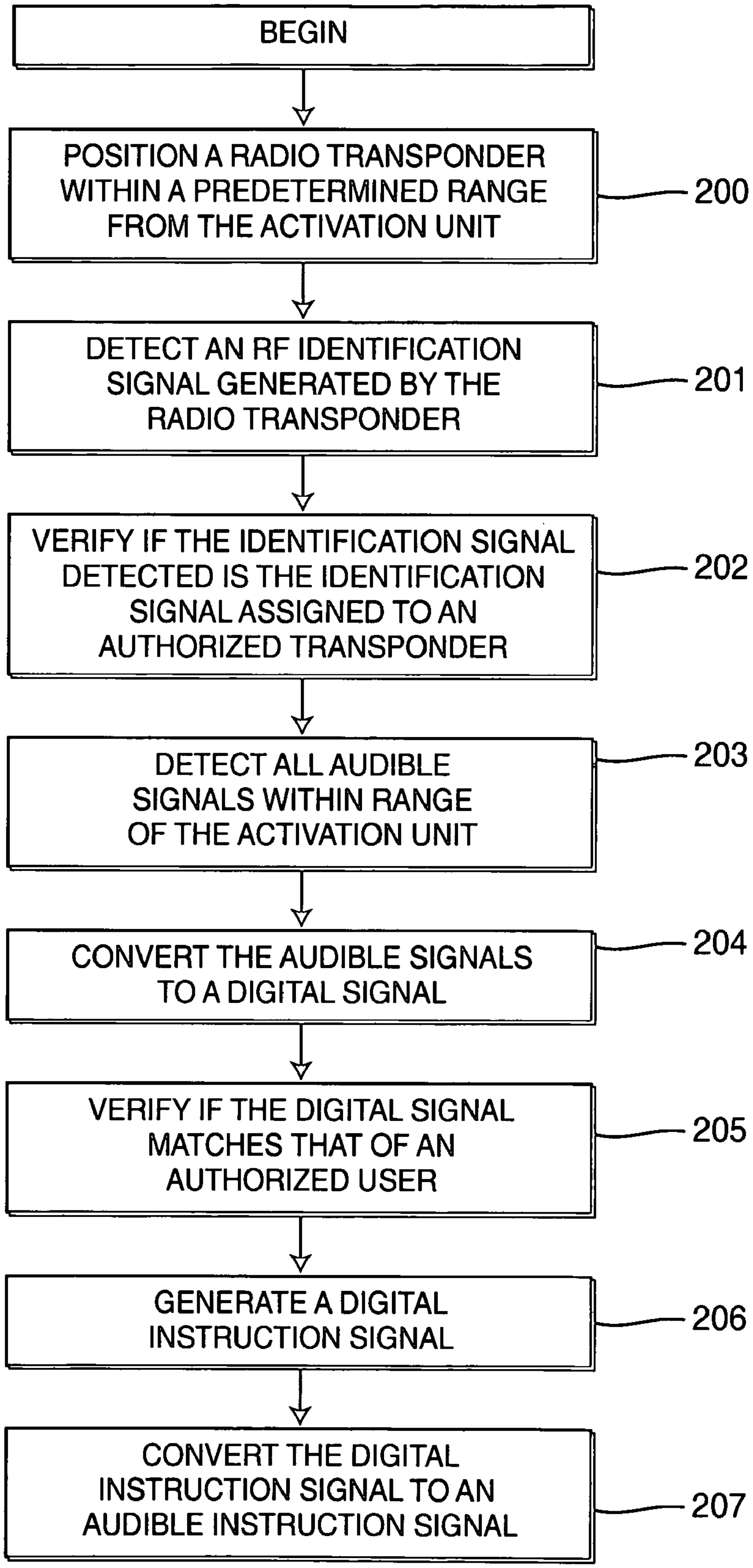
FIG. 2 is a flow diagram which illustrates the method of the present invention.

Referring to FIG. 2, a method of voice-controlling a security system with a proximity detector is described in accordance with the present invention. The method includes the steps of: positioning a radio transponder within a predetermined range from the activation unit (step 200); detecting an RF signal generated by the radio transponder including the identification code (step 201); verifying if the identification code detected is the identification code assigned to an authorized transponder (step 202); detecting all audible signals within range of the activation unit (step 203); converting the audible signal to a digital signal (step 204); verifying if the digital signal matches that of an authorized user (step 205); generating a digital instruction signal (step 206); and converting the digital instruction signal to an audible instruction signal (step 207).

Figure 4:
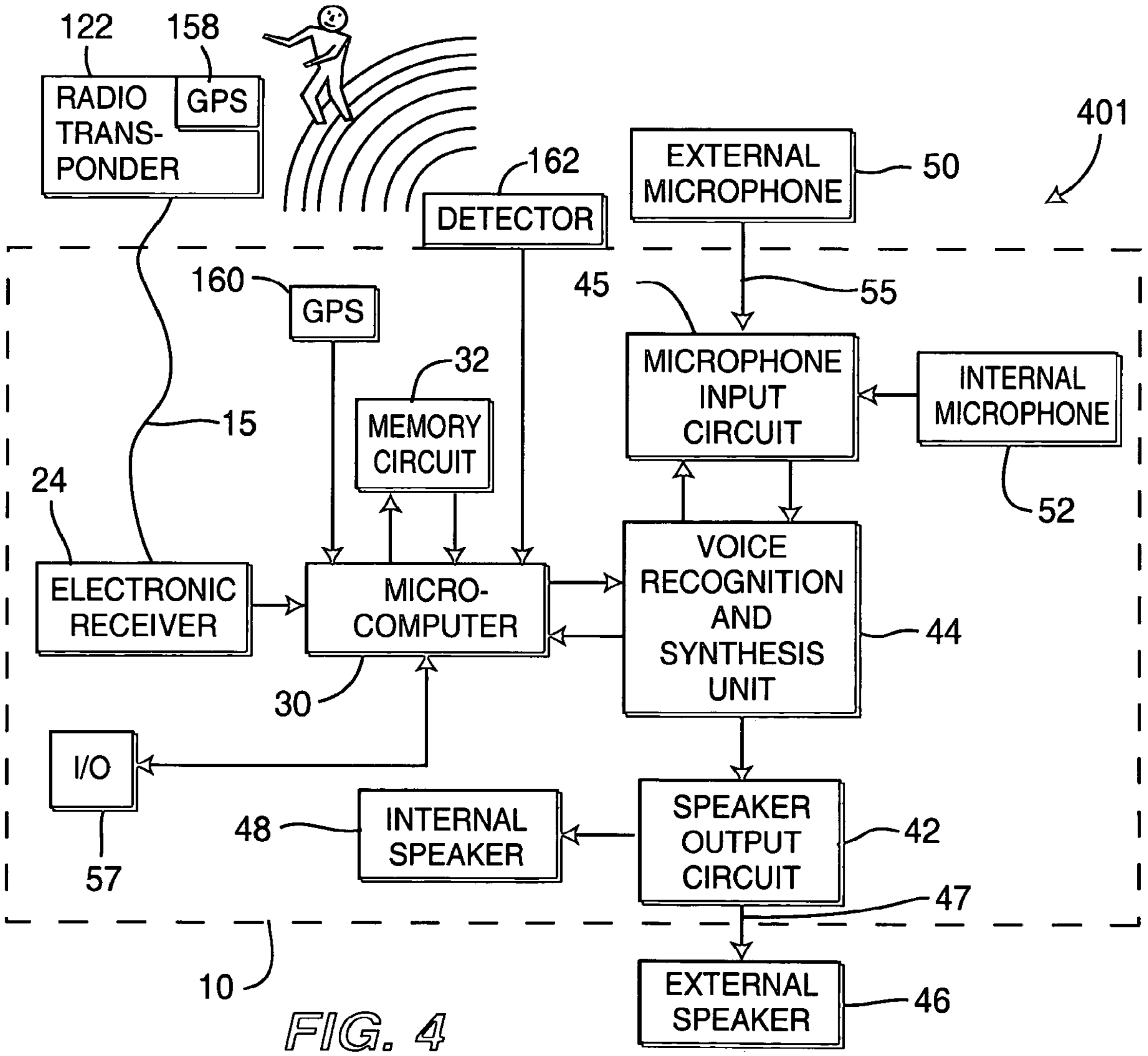
FIG. 4 is an alternative embodiment of the present invention utilizing the GPS.

An alternative embodiment 401 of the present invention is shown in FIG. 4. This embodiment is similar to the embodiment shown in FIG. 1, except that the radio transponder 122 includes a GPS locator 158 and the vehicle includes a GPS receiver 160 and a detector 162, which have outputs fed to the microcomputer 30. In this embodiment, the transponder 122 also sends a location signal to the receiver 24 as output by the GPS receiver 158. The microcomputer 30 also receives a signal from the onboard GPS receiver 160. The detector 162 detects the location of a user. Although the user and the transponder 122 are generally intended to be co-located, i.e., the transponder 122 is within the possession of the user, this may not necessarily be the case. Accordingly, the system 401 determines with precise accuracy where the transponder 22 is located and where the user is located. The detector 162 may utilize infrared, microwave, radar or any other known or future systems for locating objects, or detecting the proximity of one object to another object. If both the user and the transponder 122 are within a predetermined distance from each other, the microcomputer 30 proceeds with the authentication process as previously described hereinbefore. This provides an extra level of security.

The transponder 122 can also be programmed to advise the security device or system of the exact location of the transponder 122 and the distance between the origin of the voice command and the transponder 122. For example, if the security system 401 described above can require that the user must be in the driver's seat to activate those controls that pertain to operating the vehicle, then the commands spoken by the user will be valid only when the user is positioned in the driver's seat. In other words, the system validates that the transponder 122 is located at an exact location within the "driver's space" and then confirms the voice command is "X" distance (in a predefined range) from the transponder 122, calculating that it is also within the driver's space.

Reiterating, the microcomputer 30 may not permit certain actions to be taken depending upon the location of the transponder 122 and the proximity of the user. For example, the microcomputer 30 may refuse to engage the transmission from "park" to "drive" until the transponder 122 and the user are both in the "driver's space". In the same manner, if the vehicle is in motion, the microcomputer will disallow an otherwise authorized voice command to open the doors.

The present invention may take the place of existing remote keyless entry systems whereby a button on a keyfob may be depressed and then the voice command entered into a speaker located on the keyfob. This provides certain functions, such as those performed by the microphone, within the keyfob rather than within the vehicle. In this manner, a user may from a distance, for example in inclement weather, start up the car, turn on the windshield wipers, set the rear defroster on, and set the heat for 80°.

As aforementioned, although the present invention was described with reference to a vehicle, it should be recognized that this is equally applicable to any other individually controllable items. For example, the components shown in FIG. 1 or 4 may not be located and interfaced with a vehicle, but rather they may comprise a security system for a computer. This system, if combined or integrated with any network system or computer using a standardized or uniform interface, can also transmit an encrypted user password (or passwords). Accordingly, this not only identifies the user but by providing the password (or passwords), allows the network or computer system to automatically log in the user (when they arrive) and set the level of access being provided to that particular user. The system also automatically logs out the user when they depart. In this manner, the I/O interface 57 may interface with a computer system either electro-mechanically or via software. The particular levels of security may permit or restrict access to the computer, or even access to certain websites. These security levels and specific actions were implemented and described with reference to Table 1.

If the present invention is utilized with the doors and windows of a residence or a business, the invention may be embodied in a complete "system" whereby all of the security of the windows and doors is centrally located. In contrast, each window and door may include a separate security device as shown in FIGS. 1 and 4. In this manner, each window and door is pre-programmable to receive the user's voiceprint templates. Upon initially setting up the security of each individual window and door, a security system may record an individual's voice command, and then replay those voice commands to each individual security device.

These voiceprint templates can also be stored in the central files of the security company for even greater identification levels.

Figure 5:
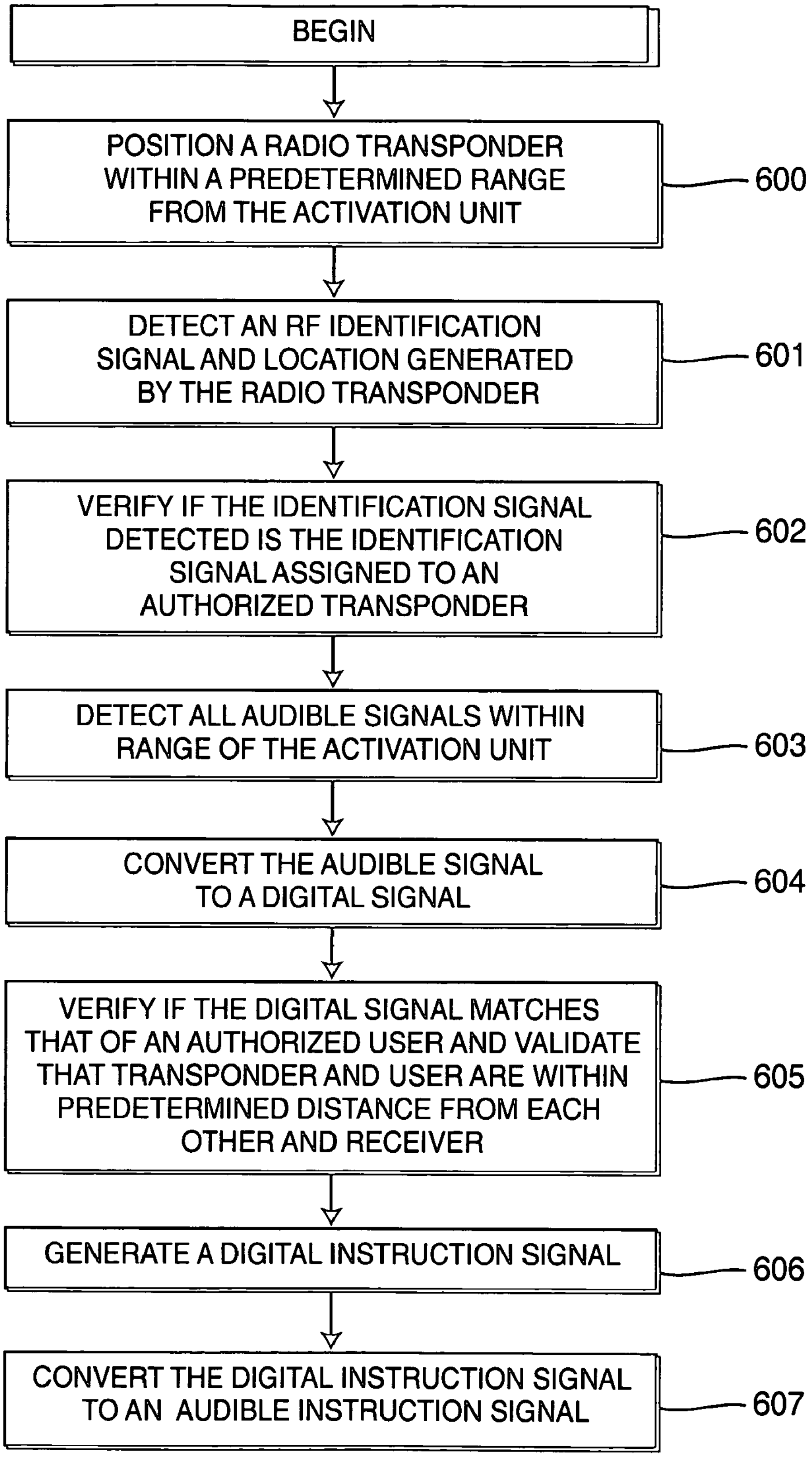
FIG. 5 is a flow diagram which illustrates an alternative method of the present invention.

An alternative method of voice-controlling a security system with a proximity detector and GPS locating is described in FIG. 5. The method includes the steps of: positioning a radio transponder within a predetermined range from the activation unit (step 600); detecting an RF signal generated by the radio transponder including the identification code and location (step 601); verifying if the identification code detected is the identification code assigned to an authorized transponder (step 602); detecting all audible signals within range of the activation unit (step 603); converting the audible signal to a digital signal (step 604); verifying if the digital signal matches that of an authorized user and validating that, the transponder and voice are within a predefined distance from each other and the receiver for the requested function (step 605); generating a digital instruction signal (step 606); and converting the digital instruction signal to an audible instruction signal (step 607).

In an alternative embodiment of the present invention, the system may act as a smart virtual assistant (hereinafter referred to as "VA") to each user in control of a transponder. It is well known in the art that companies are developing artificial intelligence. For example, Artificial Intelligence Enterprises N.V. (Ai) is one company that has a commercially-oriented research effort to achieve true artificial intelligence through the development of conversational skills in computers. They are using cutting-edge mathematical and cognitive theories and techniques, Ai's technology will be able to conduct a conversation that is not discernible from a conversation with a human being. It is in the process of developing technology that can perform numerous functions such as allowing a VA to book airline tickets for user's upcoming vacation. One can be able to ask the VA to find and book the best fare. One can ask the VA to browse the Web for a specific present at a specific price range. The VA can track the package ensuring that it arrives on time or order another item should it be delayed.

This VA can perform numerous tasks such as maintaining your schedule, take phone calls, type memos that you dictate, receiving charges from 3rd party systems (such as a car at a gas station or going thru a toll booth) and authorizing payment via a credit or debit card or asking the user for authorization to pay, etc. In this embodiment, the VA does not have to wait for a command. Rather, it can be proactive initiating a request or action as long as a user is in control— of a transponder.

For a particular system, one or more transponders can be the alpha or master transponder (hereinafter referred to as "AMT") and can allow new transponders to be added to the system. When new transponders are added, the user in possession of the AMT can select from various options. These options can be chosen verbally (i.e., being led by the VA or thru a GUI (graphic user interface). Once a transponder is programmed, it may require the user of that particular transponder to walk thru the commands to obtain the voiceprints of the user and to refine the commands with respect to what function the system is to perform when each command is spoken. Optionally, the system may initiate questions using the user's response to refine each command in real time and may parse the user's answers to create the voiceprints for future reference (i.e., to use said voiceprints as templates when the system receives a future command).

As a VA, the system may use different voices and have different personalities (i.e., identities) depending on which transponder is present and which user is speaking. These VAs may be identified and respond to specific names. This allows the system to represent itself as a different VA to each user. For example, the system may be setup to have a "Motherly" or a "Fatherly" tone/voice for a child. The VA may try to simulate another user's voice. Or, as an alternative, it could have a sexy male or female voice. A VA can be programmed to be grumpy, sad, happy etc. An AMT may be able to speak to or call multiple system identities merely by calling their name(s).

If a plurality of transponders are present, the system may respond to a command by asking questions to clarify a user's command. For example, if the command was "Open door", the system can ask if you want more than one door opened. If a child with a transponder is getting into the rear of the car, the system may ask the user with the highest hierarchy if the user wants any other doors opened; Or it may ask the child with the transponder which door she wants opened. The system may be able to retain previous results to commands or questions asked by the VA and can respond to future commands in a similar fashion based upon which transponders/users are present. The system can retain and record previous conversations. The system may summarize or replay its conversation with another user to the AMT. While summarizing, it may, or may not, use the other VA's voice/identity.

The system may interface with other systems or modules. The system may modify or change its standard operating procedure based upon the present circumstances. For example, the system may have communication with a vehicle with a power door and door sensor device. The door sensor device determines that it can only open the door a particular distance before it strikes an object. The power door only opens the door as far as it can and the VA advises this to the user. Optionally, the VA may control the door sensor and power door.

The system may send information back to a transponder that has a memory. For security reasons, the system may modify the password or identifying information and may send this updated information to the transponder. The system may update the transponder so that it can also retain and may replay previous recorded conversations or commands made by the user or other users. One significant benefit for the transponder to have a memory and be updated by the system, is that the system can create an appearance of continuity between locations. For example, if systems were installed on a laptop, car, house, and office, the user can have a conversation with the VA anytime they are, or become, within the predefined distance from each of these locations or items. And there is not lost information in that the transponder can send the previous conversation to the system at each of these locations or items updating the VA "on the fly" so that there is a seamless transparency or continuity with the VA.

What is claimed is:

1. A system for operating an automobile comprising:

a transponder having a user interface to receive commands from a user and to operate a virtual assistant, wherein the commands comprise commands for operation of a door of the automobile;

a micro-computer in the automobile responsive to the transponder;

a detector subsystem configured to determine a potential strike of an object based on a determined distance to the object;

wherein the micro-computer receives a communication from the transponder and wherein the automobile is configured to send a command to a door of the automobile in response to the communication;

wherein the system in the automobile is configured to avoid the potential strike determined by the detector system by limiting the operation of the door and advising a user regarding the potential strike; and wherein conversations, including conversations regarding the automobile, with the virtual assistant utilized by the transponder are recorded and recallable at a later time, wherein the virtual assistant responds to future commands or questions from the user based on prior commands or questions from the user.

2. The system of claim 1 wherein the system receives charges for a toll booth.

3. A method performed by a system for operating an automobile comprising:

receiving commands, by a transponder having a user interface, from a user to operate a virtual assistant, wherein the commands comprise commands for operation of a door of the automobile;

determining, by a detector subsystem, a potential strike of an object based on a determined distance to the object;

receiving, from the transponder, a communication and wherein the automobile is configured to send a command to a door of the automobile in response to the communication; and avoiding, by the system in the automobile, the potential strike determined by the detector system by limiting the operation of the door and advising a user regarding the potential strike; and wherein conversations, including conversations regarding the automobile, with the virtual assistant utilized by the transponder are recorded and recallable at a later time, wherein the virtual assistant responds to future commands or questions from the user based on prior commands or questions from the user.

4. The method of claim 3, wherein the system receives charges for a toll booth.

* * * * *